(12) United States Patent
Moher

(10) Patent No.: US 9,847,865 B2
(45) Date of Patent: Dec. 19, 2017

(54) SYSTEM AND METHOD FOR DIGITAL CANCELLATION OF SELF-INTERFERENCE IN FULL-DUPLEX COMMUNICATIONS

(71) Applicant: Huawei Technologies Co., Ltd., Shenzhen (CN)

(72) Inventor: Michael Moher, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 98 days.

(21) Appl. No.: 14/464,117

(22) Filed: Aug. 20, 2014

(65) Prior Publication Data
US 2016/0056946 A1 Feb. 25, 2016

(51) Int. Cl.
*H04L 5/14* (2006.01)
*H04B 15/00* (2006.01)
*H04B 1/525* (2015.01)

(52) U.S. Cl.
CPC .............. *H04L 5/14* (2013.01); *H04B 1/525* (2013.01); *H04B 15/00* (2013.01)

(58) Field of Classification Search
None
See application file for complete search history.

(56) References Cited

U.S. PATENT DOCUMENTS

| 9,319,078 | B2 * | 4/2016 | Ihara | H04B 1/0475 |
| 2007/0184782 | A1 | 8/2007 | Sahota et al. | |
| 2012/0250526 | A1 * | 10/2012 | Zhao | H04B 7/2606 370/243 |
| 2013/0044791 | A1 | 2/2013 | Rimini et al. | |
| 2013/0089009 | A1 * | 4/2013 | Li | H04L 27/2601 370/278 |
| 2013/0286903 | A1 * | 10/2013 | Khojastepour | H04L 5/14 370/280 |
| 2016/0211927 | A1 * | 7/2016 | Mo | H04B 1/123 |

FOREIGN PATENT DOCUMENTS

| WO | 2009090400 A1 | 7/2009 |
| WO | 2011084819 A1 | 7/2011 |

OTHER PUBLICATIONS

Mayank Jain, Jung Il Choi, Tae Min Kim, Dinesh Bharadia, Siddharth Seth, Kannan Srinivasan, Philip Levis, Sachin Katti, Prasun Sinha "Practical, Real-time, Full Duplex Wireless", MobiCom'11, Sep. 19-23, 2011, Las Vegas, Nevada, USA.*
Huawei Technologies Co., Ltd., International Search Report and Written Opinion issued in International Application No. PCT/CN2015/086520, dated Nov. 12, 2015, 11 pages.

* cited by examiner

*Primary Examiner* — Alex Skripnikov
(74) *Attorney, Agent, or Firm* — Slater Matsil, LLP

(57) ABSTRACT

Embodiments are provided for cancelling self-interference in a full-duplex communications system. The cancellation includes using a digital cancellation stage in additional to analog cancellation. In an embodiment, a method by a full-duplex communications device includes sampling a received signal, wherein the sampling provides a received digital signal corresponding to the received signal. The method further includes sampling a transmitted signal, wherein the sampling provides a transmitted digital signal corresponding to the transmitted signal. A channel distortion introducing self-interference in the received signal is then estimated according to the transmitted digital signal and the received digital signal. The method further includes estimating the self-interference in the received digital signal according to the estimated channel distortion.

19 Claims, 4 Drawing Sheets

SYSTEM AND METHOD FOR DIGITAL CANCELLATION OF SELF-INTERFERENCE IN FULL-DUPLEX COMMUNICATIONS

TECHNICAL FIELD

The present invention relates to the field of wireless communications, and, in particular embodiments, to a system and method for digital cancellation of self-interference in full-duplex communications.

BACKGROUND

In radio communications, it is desirable to transmit and receive from the same antenna or antennas. More efficiency can be achieved if the transmission and reception occurs simultaneously on the same radio channel, also referred to as full duplex on the same channel. The simultaneous transmission and reception can cause significant self-interference at the radio network component. Typically, reducing this self-interference to acceptable levels requires accurate estimation and accordingly cancelling of such interference. Multiple cancellation stages, e.g., including analog and digital stages, may also be needed to reduce self-interference effectively, which adds complexity to the transmitter/receiver system. There is a need for an effective and relatively easy to implement cancellation scheme for self-interference in full-duplex systems.

SUMMARY OF THE INVENTION

In accordance with an embodiment of the disclosure, a method for execution by a full-duplex communications device includes sampling a received signal to obtain a received digital signal corresponding to the received signal. The method further includes sampling a transmitted signal to obtain a transmitted digital signal corresponding to the transmitted signal. A channel distortion introducing self-interference in the received signal is then estimated in accordance with the transmitted digital signal and the received digital signal. The method further includes estimating the self-interference in the received digital signal according to the estimated channel distortion.

In accordance with another embodiment of the disclosure, a method by a full-duplex communications device includes sampling a transmitted signal from the full-duplex communications device, and sampling a received signal at the full-duplex communications device. Channel characteristics for self-interference are then estimated according to the sampled transmitted signal, the sampled received signal, and a model relating the received signal to the transmitted signal and the channel characteristics. The method further includes estimating the self-interference in the received signal according to the estimated channel characteristics.

In accordance with yet another embodiment of the disclosure, a communications device for full-duplex communications comprises a transmitter chain configured to transmit a first signal, a receiver configured to receive a second signal, and an antenna coupled to the transmitter chain and the receiver. The device further comprises a passive analog cancellation circuit positioned between the transmitter chain, receiver, and the antenna, and configured to reject the first signal from a reception path between passive cancellation circuit and the receiver. Additionally, the device comprises a digital cancellation circuit coupled to the receiver and the transmitter chain, and configured to sample the first signal and the second signal, and estimate self-interference in the sampled second signal according to the sampled first signal and an estimate of a distortion channel inside the communications device.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In full-duplex transmissions, signals are transmitted and received simultaneously on the same frequency channel using a common antenna of a communications device. As such, a portion of the transmitted signals can be reflected into the receiver causing interference with the detected signals. This is referred to as self-interference. To receive and detect the signals with sufficient accuracy, an interference cancellation scheme is needed. A suitable and effective implementation includes multiple cancellation stages, e.g., both analog and digital cancellation. Embodiments are provided herein for cancelling self-interference in full-duplex communications. The cancellation includes using a digital cancellation stage in additional to analog cancellation in the full-duplex transmitter/receiver device.

Figure 1:
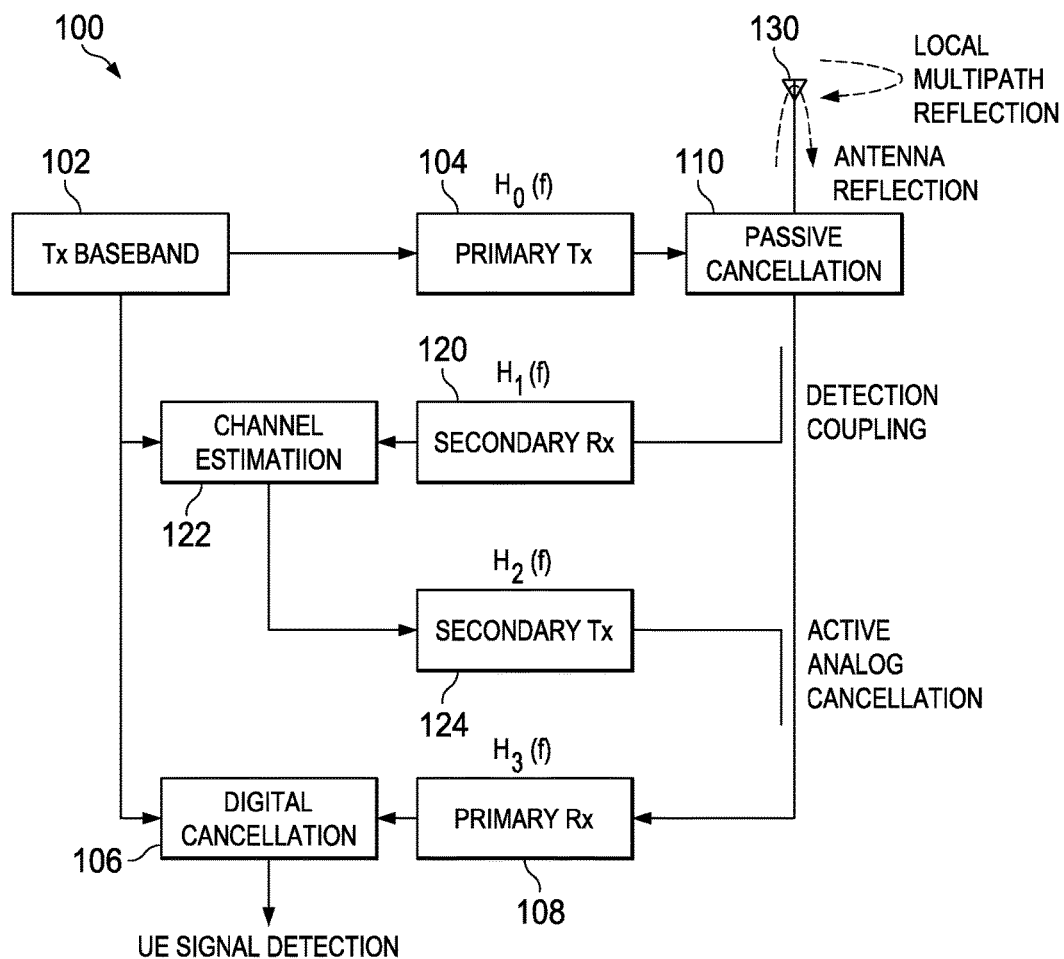
FIG. 1 illustrates an embodiment of a full-duplex system for cancelling self-interference.

FIG. 1 shows an embodiment of a full-duplex system 100 for cancelling self-interference. The system 100 may correspond to any wireless communications device or network component with full-duplex capability, such as a radio node of the network or a user device. The system 100 comprises a primary transmit chain including a baseband transmitter (Tx) 102, a primary Tx 104, a passive isolation or cancellation circuit 110, and an antenna 130, which are arranged as shown. The passive isolation circuit 110 implements passive analog cancellation, by providing a level of separation between a transmitted signal from the transmitter 104 and a received signal via the same antenna 130.

The system 100 further comprises a secondary receive and transmit chain for applying an active analog cancellation stage. This stage is an optional stage and can be removed in another embodiment. The secondary receive and transmit chain includes a secondary receiver (Rx) 120, a secondary Tx 124, and a channel estimation circuit 122, which are arranged as shown. The secondary chain samples the received signal from the passive isolation circuit 110. With knowledge of the transmitted signal from the primary Tx 104, the channel estimation circuit 122 estimates the channel characteristics of the self-interference. Upon estimating the channel characteristics, the self-interference is estimated and then subtracted from the received signal.

The system 100 further comprises a primary receive chain that processes the received signal after the active analog cancellation. The primary receive chain includes a primary Rx 108 that receives the received signal, and a digital cancellation module 106 that estimates any residual self-interference present in the received signal using knowledge of the transmitted signal. At this digital cancellation stage, the signal samples may be buffered before detection of the received signal.

In the system 100, the transmitted signal may be reflected from the antenna 130 multiple times. For instance, the signal reflection may be internal to the passive cancellation circuit 110 due to an impedance mismatch between the isolator transmit port and the subsequent cabling. A second reflection can exist due to a reflection from the antenna 130, e.g., due to impedance mismatch. Additional reflections may also exist from the local environment of the system 100, which is referred to herein as local multipath. It is expected that the internal reflections of the circuit 110 and the antenna 130 are substantially stronger than the additional reflections of the local multipath. The passive cancellation at the circuit 110 can be designed to reduce the stronger reflections to a level comparable to reflections of the local multipath. The active analog cancellation stage of the secondary receive and transmit chain can be designed to estimate this multipath channel and re-create the residual interference due to the reflections of the multipath.

Due to time and complexity constraints on this multipath channel estimation, removing all of the residual interference is difficult. However, the active analog cancellation stage can reduce the self-interference to a level where it can be digitally sampled by the primary Rx 108 without distortion. As such, the digital cancellation of the primary receive chain can remove a substantial portion of the remaining self-interference, resulting in negligible residual interference in the detected signal. Further, by buffering the received signal samples, the digital cancellation does not suffer from the same time constraints as the active analog cancellation.

To analyze the signals of the full-duplex system 100, the complex baseband of the transmitted signal in the baseline can be represented as r(t). The self-interference may be represented as a multipath signal as $$s(t) = \sum_{i=1}^{N} g_i r(t - \tau_i), \qquad (1)$$

where there are N reflected paths with complex gain $g_i$ and $\tau_i$ delays of respectively. The active analog cancellation estimates this self-interference as $$\hat{s}(t) = \sum_{i=1}^{M} h_i r(t - iT), \qquad (2)$$

where T is the baseband sample period, $h_i$ are complex gains, and M controls the impulse response length (and complexity). The residual self-interference after the active analog cancellation is determined as w(t)=s(t)−ŝ(t). Regardless of how poor the estimation of equation (2) may be, the residual interference w(t) is still a linear function of the transmitted signal r(t).

Using a discrete time approach, the residual self-interference in the digital processing module 106 is represented as $$\hat{w}(t) = \sum_{i=1}^{M'} w_i r(t - iT). \qquad (3)$$

To keep complexity manageable, the analysis assumes that the sampling period T does not change from the sampling of the active cancellation stage. However, the number of taps in the finite impulse response model of the channel may change from M to M'. Given a block of N T-spaced samples of the received signal w(t), and the transmitted signal r(t), the data matrix is defined as $$R = \begin{bmatrix} r_n & r_{n-1} & \cdots & r_{n-M'+2} & r_{n-M'+1} \\ r_{n+1} & r_n & r_{n-1} & \cdots & r_{n-M'} \\ r_{n+2} & r_{n+1} & r_n & \cdots & r_{n-M'-1} \\ \vdots & \vdots & \vdots & \vdots & \vdots \\ \vdots & \vdots & \vdots & \vdots & \vdots \\ r_{n+N-2} & r_{n+N-3} & \cdots & r_{n+N-M'} & r_{n+N-M'-1} \\ r_{n+N-1} & r_{n+N-2} & r_{n+N-3} & \cdots & r_{n+N-M'} \end{bmatrix} \qquad (4)$$

$$\text{and } w = \begin{bmatrix} w_n \\ w_{n+1} \\ \vdots \\ w_{n+N-1} \end{bmatrix} \qquad (5)$$

According to the above, the self-interference by the linear system is represented as $$w = Rh + n, \qquad (6)$$

where n represents noise. The minimum mean square error solution for the channel estimate h is defined by $$\hat{h} = (R^H R)^{-1} R^H w. \qquad (7)$$

The minimum mean square error solution can be computed or calculated using any suitable method, such as using the pinv( ) function of Matlab.

In the active analog cancellation, the time delay between channel estimation and its applications can cause degraded performance, where the channel may be slowly time-varying, such as in fading channels or other situations with slowly-changing environments. A second issue of the active analog cancellation is complexity. Further, the secondary chain in the system 100 may introduce distortions. However, since such distortions are linear, they can be part of the channel estimated by the digital cancellation stage. The complexity of the digital cancellation stage is acceptable as a tradeoff for improving processing latency.

Upon obtaining a digital representation of the interference, the digital domain cancellation is implemented. The digital domain processing is advantageous since it is not subject to the real-time delays of an analog signal. The signals can be buffered to ensure that estimates and cancellation are aligned in time. The analog and digital processing/cancellation in the different stages can be linear. Thus, even if some distortion has been introduced, e.g., using a time-delayed channel estimate, the distortion is linear and can still be corrected linearly. According to this observation, the channel estimation and corresponding computation of the cancellation signal is repeated as a first step of the digital cancellation for the residual interference in the received signal. Repeating this operation allows avoiding the time delay between estimation and application via buffering.

Figure 2:
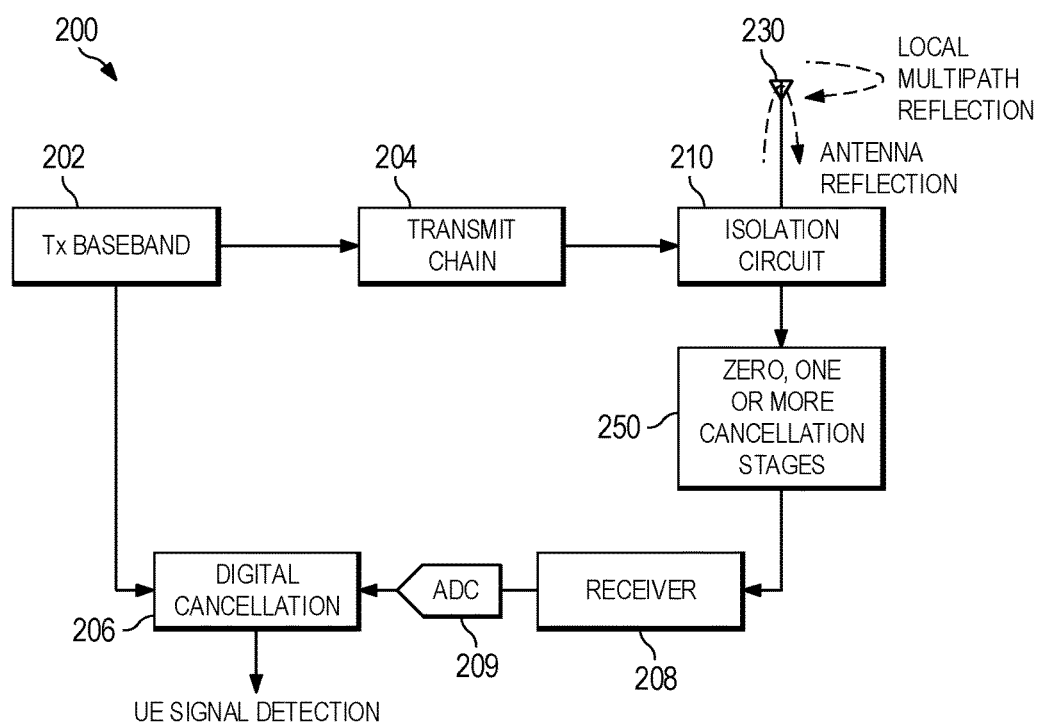
FIG. 2 illustrates another embodiment of a full-duplex system for cancelling self-interference.

FIG. 2 shows another embodiment of a full-duplex system 200 for cancelling self-interference. The system 200 may correspond to any wireless communications device or network component with full-duplex capability, such as a radio node of the network or a user device. The system 200 comprises a baseband Tx 202, a transmit chain 204, an isolation circuit 210, an antenna 230, a receiver 208, an analog to digital convertor (ADC) 209, and a digital cancellation unit 206, which are arranged as shown. The components above are configured similar to the respective components in the system 100. In addition to the isolation circuit 210, the system 200 may or may not include one or more additional cancellation stages 250 between the isolation circuit 210 and the receiver 208. For instance, the cancellation stage(s) 250 may be similar to the secondary receive and transmit chain of the system 100.

The baseband Tx 202 and transmit chain 204 form the baseband and radio frequency (RF) portions, respectively, of the transmitted signal. The transmitted signal is fed to the antenna 230 for transmission by the isolation circuit 210. The isolation circuit 210 separates the transmitted and a received signal from the antenna 230. The isolation circuit 210 can be a RF circulator, but other implementations are possible. The RF circulator rejects the transmitted signal from the received signal path, but this rejection is not perfect and there can be significant transmitted energy present on the receive path in the form of self-interference. The isolation circuit 210 is one stage of the interference cancellation stage, but one or more additional stages 250 can be added to further remove self-interference from the received signal.

The self-interference can include reflections of the transmitted signal from the antenna 230 and from the isolation circuit 210, and thus represents a distorted version of the transmitted signal. There may be other distortions introduced by the one or more interference cancellation stages 250. The digital cancellation unit 206 is configured to digitally estimate these distortions, also referred to herein as a channel, and apply the channel estimation to the original digitally-sampled signal to create a digital cancellation signal. Specifically, the digital cancellation unit 206 uses knowledge of the baseband samples and the original transmitted signal to sample the self-interference remaining in the received signal at the receiver 208, after converting the signal to digital by the ADC 209. The digital cancellation signal is then applied to the received signal to detect the signal after self-interference cancellation. Thus, the final detected signal contains no or negligible remaining interference, which can be considered part of the noise in the signal.

Figure 3:
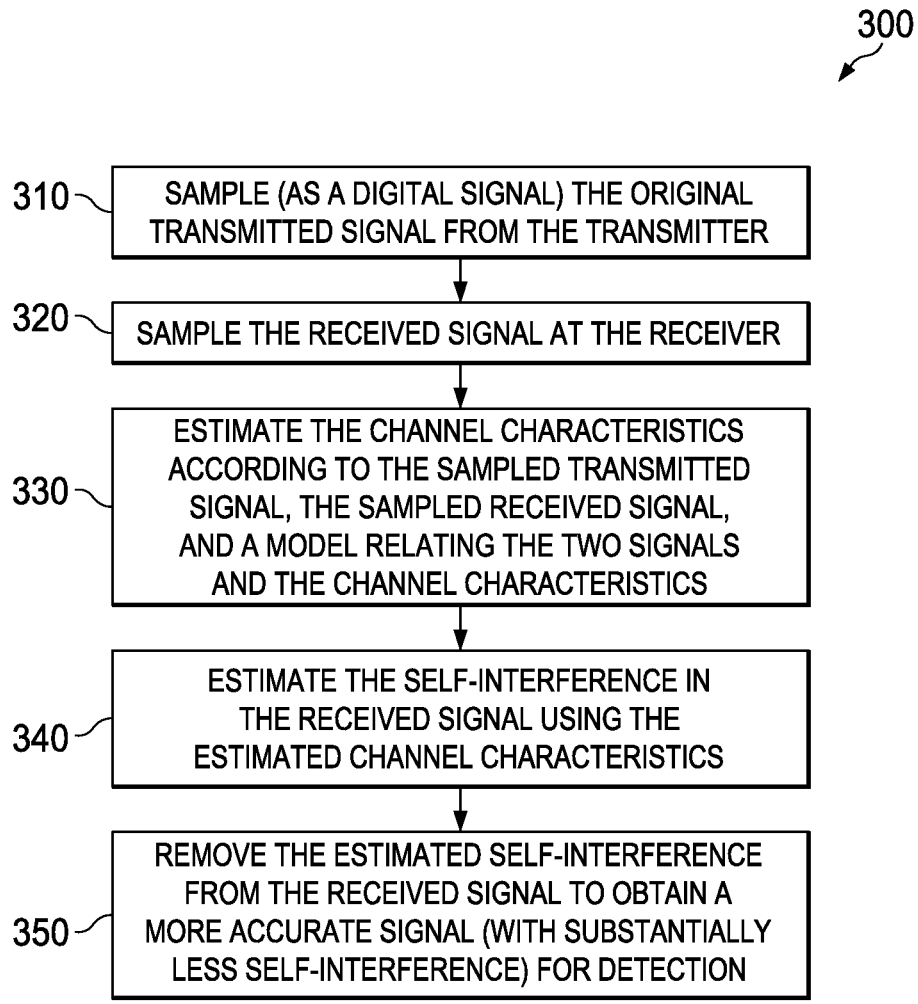
FIG. 3 illustrates an embodiment of a method for self-interference cancellation in a full-duplex system.

FIG. 3 shows an embodiment of a method 300 for self-interference cancellation in a full-duplex system, such as the system 100 or 200. At step 310, the receiver samples (as a digital signal) the original transmitted signal from the transmitter. At step 320, the receiver (at the digital cancellation module 106 or digital cancellation unit 206) samples the received signal at the receiver. At step 330, the channel distortion characteristics are estimated according to the sampled transmitted signal, the sampled received signal, and a model relating the two signals and the channel characteristics. For instance, the block of samples of the original transmitted signal is represented as $x=\{x_0, x_1, \ldots, x_{N-1}\}$, and the corresponding block of the sampled received signal is represented as $y=\{y_0, y_1, y_2, \ldots y_{N-1}\}$. The block x is known to the receiver. The model for channel estimation is $y=Xh+n$, where h is the distortion channel function and $$X = \begin{bmatrix} x_n & x_{n-1} & \cdots & x_{n-M+2} & x_{n-M+1} \\ x_{n+1} & x_n & x_{n-1} & \cdots & x_{n-M} \\ x_{n+2} & x_{n+1} & x_n & \cdots & x_{n-M-1} \\ \vdots & \vdots & \vdots & \vdots & \vdots \\ \vdots & \vdots & \vdots & \vdots & \vdots \\ x_{n+N-2} & x_{n+N-3} & \cdots & x_{n+N-M} & x_{n+N-M-1} \\ x_{n+N-1} & x_{n+N-2} & x_{n+N-3} & \cdots & x_{n+N-M} \end{bmatrix}$$

is the data matrix obtained from x. The value of n in the definition of X may be 0 and $x_k$ for k<0 is zero, or it may be any positive integer less than N−M. Typically N>M, and the channel model is an over-determined linear system. Various methods can be used for solving for h. Different methods may work better than others, e.g., depending on the dimension M of h which affects both the accuracy of the channel estimate and the complexity of the implementation. At step 340, the self-interference in the received signal is estimated using the estimated channel characteristics h. This can be represented as $\hat{y}=Xh$, where $\hat{y}$ is the self-interference. At step 350, the estimated self-interference is removed from the received signal to obtain a more accurate signal (with substantially less self-interference) for detection. This can be achieved by subtracting the estimated self-interference from the sampled received digital signal: $r=y-\hat{y}$, where r represents the digital detected signal.

Figure 4:
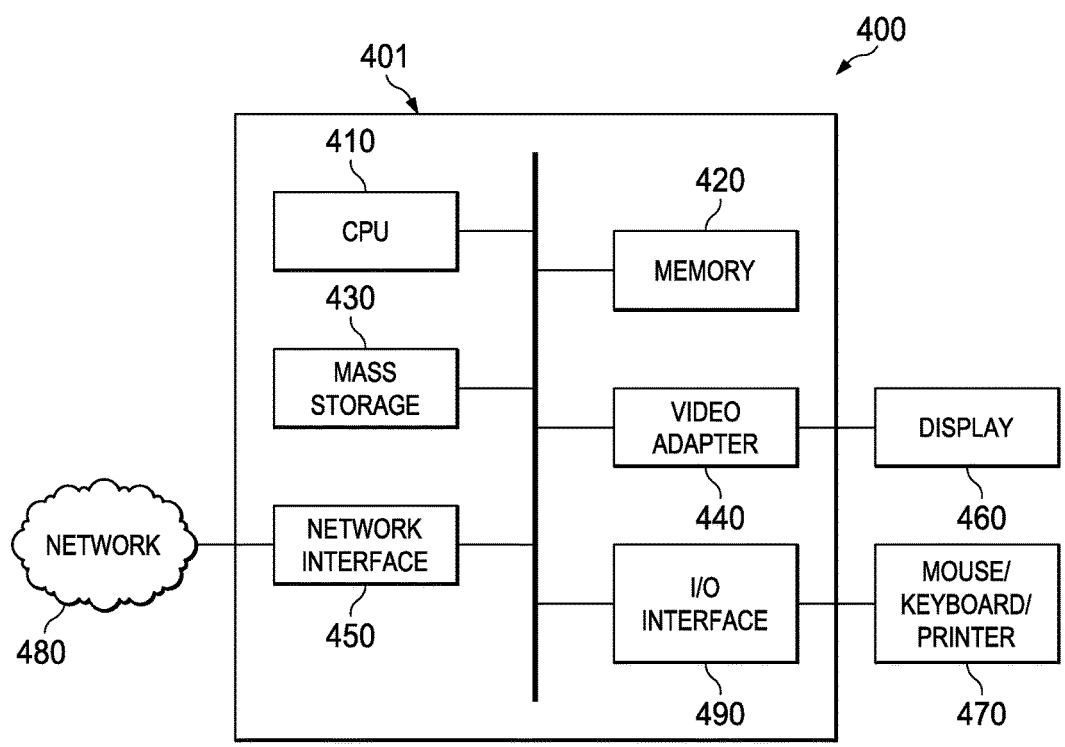
FIG. 4 illustrates a processing system that can be used to implement various embodiments.

FIG. 4 is a block diagram of an exemplary processing system 400 that can be used to implement various embodiments. For example, the processing system can be part of a full-duplex system or radio communications component, such as the full-duplex system 100 or 200. The processing system 400 may comprise a processing unit 401 equipped with one or more input/output devices, such as a speaker, microphone, mouse, touchscreen, keypad, keyboard, printer, display, and the like. The processing unit 401 may include a central processing unit (CPU) 410, a memory 420, a mass storage device 430, a video adapter 440, and an Input/Output (I/O) interface 490 connected to a bus. The bus may be one or more of any type of several bus architectures including a memory bus or memory controller, a peripheral bus, a video bus, or the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. The combination of the data processing elements and memory may be implemented in a field-programmable gate array (FPGA) or application-specific integrated circuit (ASIC). The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The video adapter 440 and the I/O interface 490 provide interfaces to couple external input and output devices to the processing unit. As illustrated, examples of input and output devices include a display 460 coupled to the video adapter 440 and any combination of mouse/keyboard/printer 470 coupled to the I/O interface 490. The video interface may be used for monitoring the performance of the system. Other devices may be coupled to the processing unit 401, and additional or fewer interface cards may be utilized. For example, a serial interface card (not shown) may be used to provide a serial interface for a printer.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for execution by a full-duplex communications device, the method comprising:
   generating a baseband transmit signal and converting the transmit baseband signal to a first analog signal;
   receiving a second analog signal while simultaneously transmitting the first analog signal, the received analog signal having first self-interference according to the transmitted analog signal;
   removing the first self-interference from the received analog signal with one or more cancellation stages to produce a processed signal, the one or more cancellation stages introducing second self-interference in the processed signal, the second self-interference being a lower level of interference than the first self-interference, the second self-interference being linear distortions;
   sampling the received analog signal to obtain a received digital signal corresponding to the received analog signal;
   sampling the baseband transmit signal to obtain a transmitted digital signal corresponding to the transmitted analog signal;
   estimating a first channel distortion in the processed signal, the first channel distortion corresponding to the first self-interference, the first channel distortion estimated with a linear model relating the received digital signal to the first channel distortion, noise in the received digital signal, and a data matrix produced according to the transmitted digital signal, the estimating comprising determining the first channel distortion from the linear model using a minimum mean square error solution for the first channel distortion; and
   estimating the second self-interference in the received digital signal according to the estimated first channel distortion; and
   removing the estimated second self-interference from the received digital signal.

2. The method of claim 1 further comprising, before estimating the first channel distortion, buffering the received digital signal according to a defined number of sampling points for the received analog signal.

3. The method of claim 1 further comprising obtaining an improved received analog signal by removing the estimated second self-interference from the received digital signal.

4. The method of claim 1 further comprising rejecting the transmitted analog signal from a reception path for the received analog signal at an isolation circuit positioned at an intersection of a transmission path for the transmitted analog signal and the reception path.

5. The method of claim 1, wherein the removing the estimated second self-interference is performed in a digital domain, and wherein the removing the first self-interference is performed in an analog domain and comprises:
   before the sampling the received analog signal and the baseband transmit signal, estimating a second channel distortion in the received analog signal according to the transmitted analog signal and the received analog signal;
   estimating the first self-interference in the received analog signal according to the estimated second channel distortion in the received analog signal; and
   removing the estimated first self-interference in the received analog signal before removing the estimated second self-interference from the received digital signal, wherein the estimated second self-interference is residual self-interference after removing the estimated first self-interference.

6. A method by a full-duplex communications device, the method comprising:
   sampling a transmit signal in the full-duplex communications device;
   transmitting the transmit signal via an antenna;
   receiving a receive signal via the antenna;
   sampling the received signal at the full-duplex communications device;

estimating channel characteristics for first self-interference according to the sampled transmit signal, the sampled received signal, and a linear model relating the received signal to a data matrix produced according to the sampled transmit signal, to noise in the sampled received signal, and to the channel characteristics, wherein estimating the channel characteristics comprises solving for the channel characteristics in the linear model using a minimum mean square error solution for the channel characteristics; and estimating the first self-interference in the received signal according to the estimated channel characteristics.

7. The method of claim 6 further comprising removing the estimated first self-interference from the received signal.

8. The method of claim 6, wherein the linear model relates a row vector of the sampled received signal to a product of the data matrix according to the sampled transmit signal and a column vector of the channel characteristics, and wherein estimating the channel characteristics comprises solving for the column vector in the linear model using the minimum mean square error solution.

9. The method of claim 8, wherein the row vector of the sampled received signal has a first length equal to a number of sampled signals, and wherein the column vector of the channel characteristics has a second length equal to a dimension suitable for the channel characteristics.

10. The method of claim 9, wherein the number of sampled signals exceeds the dimension for the channel characteristics.

11. A communications device for full-duplex communications, the communications device comprising:
a transmitter chain configured to transmit a first signal;
a receiver configured to receive a second signal;
an antenna coupled to the transmitter chain and the receiver;
a passive analog cancellation circuit positioned between the transmitter chain, the receiver, and the antenna, and configured to reject the first signal from a reception path between the passive analog cancellation circuit and the receiver; and
a digital cancellation circuit coupled to the receiver and the transmitter chain, and configured to sample the first signal and the second signal, and estimate first self-interference in the sampled second signal according to the sampled first signal and an estimate of a distortion channel inside the communications device; and
a processor configured to determine the estimate of the distortion channel with a linear model relating the second signal to the distortion channel, noise in the second signal, and a data matrix produced according to the first signal, wherein processor configured to determine the estimate of the distortion channel comprises the processor configured to determine the distortion channel from the linear model using a minimum mean square error solution for the distortion channel.

12. The communications device of claim 11, wherein the digital cancellation circuit is further configured to remove the estimated first self-interference from the sampled second signal.

13. The communications device of claim 11, wherein the distortion channel represents self-interference in the second signal due to multiple reflections of the first signal and the second signal along multiple paths in the communications device.

14. The communications device of claim 11, wherein the digital cancellation circuit is further configured to buffer a defined number of samples of the second signal before estimating the first self-interference.

15. The communications device of claim 11 further comprising an active analog cancellation circuit positioned between the passive analog cancellation circuit, the transmitter chain, and the receiver, and configured to estimate a second self-interference in the second signal according to the first signal and an estimate of a second distortion channel inside the communications device.

16. The communications device of claim 15, wherein the active analog cancellation circuit is further configured to remove the second self-interference from the second signal before removing the first self-interference from the sampled second signal, wherein the estimated first self-interference corresponds to residual self-interference after removing the estimated second self-interference.

17. The communications device of claim 15, wherein the active analog cancellation circuit includes:
a secondary receiver coupled to the passive analog cancellation circuit;
a secondary transmitter coupled to the receiver; and
a channel estimation circuit coupled to the secondary receiver, the secondary transmitter, and the transmitter chain.

18. The communications device of claim 11, wherein the transmitter chain includes a baseband transmitter and a radio frequency signal transmitter in series.

19. The communications device of claim 11 further comprising an analog to digital converter positioned between the receiver and the digital cancellation circuit.

* * * * *